United States Patent
Masaki et al.

(10) Patent No.: US 6,225,774 B1
(45) Date of Patent: May 1, 2001

(54) MOTOR CONTROL METHOD AND MOTOR CONTROL SYSTEM

(75) Inventors: Ryozo Masaki; Yoshitaka Iwaji, both of Hitachi; Satoru Kaneko, Ibaraki, all of (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/421,368

(22) Filed: Oct. 19, 1999

Related U.S. Application Data

(63) Continuation of application No. 09/094,467, filed on Jun. 10, 1998, now Pat. No. 6,043,624.

(30) Foreign Application Priority Data

Jun. 10, 1997 (JP) .................................................. 9-151889

(51) Int. Cl.⁷ ...................................................... H02P 5/17
(52) U.S. Cl. ........................ 318/723; 318/722; 318/724; 318/254
(58) Field of Search .................... 318/138, 254, 318/293, 439, 700, 720, 721, 722, 723, 724

(56) References Cited

U.S. PATENT DOCUMENTS

| | | | |
|---|---|---|---|
| 4,447,771 | * 5/1984 | Whited | 318/661 |
| 4,490,661 | * 12/1984 | Brown et al. | 318/661 |
| 4,763,057 | * 8/1988 | Danz et al. | 318/809 |
| 4,823,056 | * 4/1989 | Watanabe et al. | 388/829 |
| 5,581,169 | * 12/1996 | Kerkman et al. | 318/811 |
| 5,680,299 | 10/1997 | Yasuda et al. | 363/41 |

FOREIGN PATENT DOCUMENTS

| | | |
|---|---|---|
| 6-197547 | 7/1994 | (JP) . |
| 6-197550 | 7/1994 | (JP) . |
| 7-67350 | 3/1995 | (JP) . |

OTHER PUBLICATIONS

High Performance Vector Controlled Three–level GTO Inverter System for Electric Traction, Proceedings of 1995 International Power Electronics Conference "IPEC–Yokohama '95", The Institute Of Electrical Engineers Of Japan, 4 pages, 1995.

* cited by examiner

Primary Examiner—Bentsu Ro
(74) Attorney, Agent, or Firm—Evenson, McKeown, Edwards & Lenahan, P.L.L.C.

(57) ABSTRACT

In an a.c. motor control method and apparatus, operations are carried out at a current controller and a voltage setting using interrupt signals generated in synchronism with maximum and minimum values of a carrier wave at a control device for controlling an inverter for driving an alternating current motor. In operations at the voltage setting part carried out using one of the interrupt signals, a carrier wave is corrected in such a manner that phases of voltage command values gradually come into synchronism with a carrier wave. An integral multiple of the period of the carrier wave becomes the period of the a.c. voltage and current control operation timing is carried out in synchronism with the carrier wave.

6 Claims, 21 Drawing Sheets

MOTOR CONTROL METHOD AND MOTOR CONTROL SYSTEM

This application is a continuation of application Ser. No. 09/094,467, filed Jun. 10, 1998, now U.S. Pat No. 6,043,624.

BACKGROUND OF THE INVENTION

The present invention relates to a motor control device and power control device.

Generally, power conversion devices are driven by Pulse Width Modulation (hereinafter referred to as "PWM") signals obtained by comparing a voltage command value and a fixed frequency triangular-shaped carrier wave and are configured to generate a prescribed voltage.

Further, motors can be made small when they are driven by a power conversion device having a high frequency output current. However, in this case, beat phenomena oscillating at a low frequency can occur in the output current of power conversion device, because the frequency of output current is in the region of $\frac{1}{10}$ to $\frac{1}{3}$ of the carrier frequency of the power conversion device.

In a known method of resolving this problem, the frequency of the carrier is set at a multiple of the output frequency of the power conversion device, (particularly, an odd number multiple, such as 1, 3, 5, 9), and the motor is driven with the PWM signal in synchronism with the output frequency. (This is referred to in the following as the "synchronous PWM method").

This is disclosed in, for example, Japanese Patent Laid-open Publication No's. Hei. 7(1995)-227085, Hei. 7(1995)-67350 and Hei. 6(1994)-197550. These are a first group of example publications where V/F fixed control is carried out so that a ratio of motor voltage and frequency is approximately constant.

Moreover, in "HIGH PERFORMANCE VECTOR CONTROLLED THREE-LEVEL GTO INVERTER SYSTEM FOR ELECTRIC TRACTION" listed in Proceedings of 1995 International Power Electronics Conference (IPEC-Yokohama '95) a method is shown where torque of an "alternating current" (hereinafter abbreviated to "a.c.") motor is controlled using current control while carrying out a synchronous PWM method using space vectors. This method is capable of current control up to higher frequencies when compared with the first group of example publications. This is referred to as a second publication group.

With the synchronous PWM method where carrier waves are compared, when the carrier wave frequency is an even multiple of the output frequency, a distorted wave shape of even harmonic waves becomes superimposed with the output voltage. A third publication example, Japanese Patent Laid-open Publication No. Hei. 6(1994)-197547, discloses well known technology for resolving this problem in synchronous PWM methods employing carrier wave comparisons. Here, the occurrence of even harmonic voltages is suppressed while making the carrier frequency an even-number multiple of the output frequency, by performing inversion or non-inversion control on the PWM signal based on the voltage phase. A finer pulse number can therefore be achieved in the synchronous PWM method, and improvements in the output current waveform can therefore be made.

However, these example publications did not take into account the following points.

The first example publication group, utilizes open loop control of current and speed based on V/F fixed control, and is therefore not suitable for applications in products requiring fine control of motor torque and speed at high speeds. Also, while the carrier frequency for generating the synchronous PWM signal is clearly decided using a speed command value, this becomes complex when carrying out feedback control and can therefore not be applied as is in this case.

The second example publication, uses a PWM signal generating method employing space vectors, and complicated operations for PWM signal generation therefore have to be carried out in an extremely short time. It is therefore necessary to employ a high-performance microprocessor or a digital signal processor capable of high speed arithmetic processing at the control device, which makes the control device expensive.

In the third example publication, a PWM signal-generating processor has to be added to take into consideration dead time for arm short-circuit prevention in order to obtain a PWM signal for driving switching elements of an upper arm and a lower arm of the electric conversion device, which makes the circuit more complex.

SUMMARY OF THE INVENTION

A first object of the present invention is to provide a motor-control device capable of controlling output currents of a power conversion device at frequencies in excess of $\frac{1}{10}$ of the frequency of a carrier wave, in a highly effective manner and with a low-cost. control device.

A second object of the present invention is. to suppress the occurrence of even harmonic voltages where the carrier wave frequency is an even multiple of an output frequency at a power control device, while at the same time obtaining a PWM signal with a simple arithmetic device taking into consideration dead time for arm short-circuit prevention.

In order to achieve the first object, according to the present invention there is provided a motor control method for comparing a current of an a.c. motor and a current command value, calculating an a.c. voltage command value applied to the a.c. motor from results of the comparison, generating a pulse width modulation signal by comparing the a. c. voltage command value and a carrier wave and applying an a.c. voltage to the a.c. motor using th e pulse width modulation signal in such a manner as to control the a.c. motor. Here, operation timing of the a.c. voltage command value is in synchronism with the carrier wave, and the frequency of the carrier wave is N times (where N is an integer) the frequency of the a.c. voltage command value.

In order to achieve the second object, according to the present invention there is provided a motor control system comprising a carrier wave generator, pulse width modulation controller, an inverter and a switcher. The carrier wave generator is for generating first and second carrier waves having a prescribed difference. The pulse width modulation controller is for generating first and second pulse width modulation signals by comparing a voltage command value and the first and second carrier waves. The inverter is for driving a pair of positive side and negative side switching elements with the first and second PWM signals and generating a voltage. The switcher is for alternately applying the first and second pulse width modulation signals to the positive side and negative side switching elements.

DETAILED DESCRIPTION OF THE PREFERRED EMBODIMENTS

First Embodiment

Figure 1:
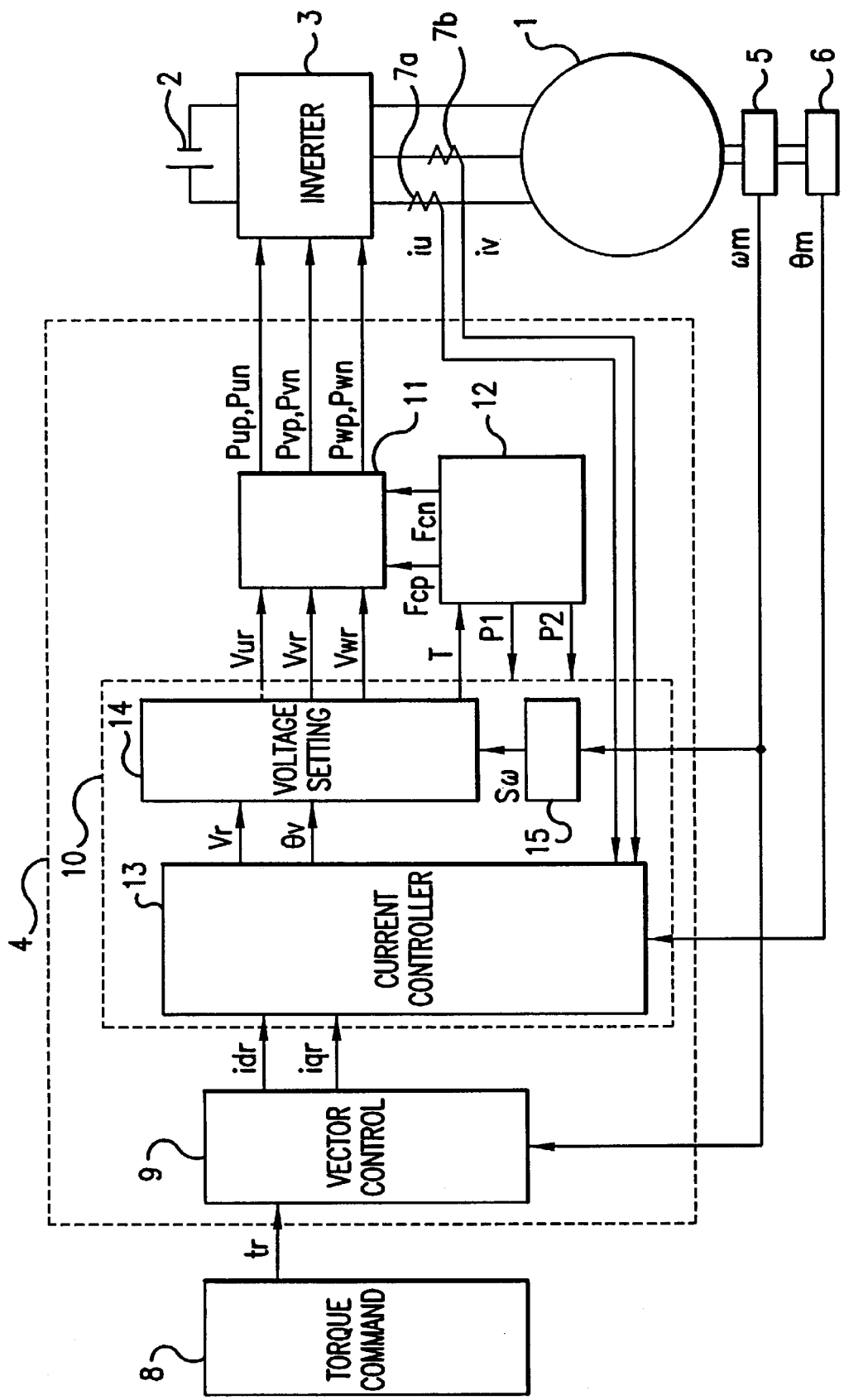
FIG. 1 is a view showing a configuration of a synchronous motor drive system of a first embodiment of the present invention.

The following is a description using FIG. 1 of a first embodiment of the present invention.

FIG. 1 shows a motor driving device that converts energy of a power supply 2 at a three-phase inverter 3 and drives a synchronous motor 1.

The inverter 3, which is controlled by PWM signals Pu, Pv and Pw outputted from a control device 4, generates a three-phase a.c. voltage and drives the synchronous motor 1.

At the control device 4, in order to obtain the PWM signals Pu, Pv and Pw, motor speed $\omega_m$ of the synchronous motor 1 (from a speed detector 5), magnetic pole position $\theta_m$ (from a magnetic pole position detector 6) and phase currents iu and iv (from a.c. sensors 7a and 7b) are taken as input, and a torque command value tr (outputted from a torque command generating device 8) is taken in. This control device 4 mainly comprises a vector control operation device 9, a voltage operation device 10, a PWM generation device 11 and a carrier wave generating device 12.

At the vector control operation device 9 taking the torque command value tr as input, the torque generated by the motor is obtained by computing a d-axis current command value idr and a q-axis current command value iqr in such a manner as to achieve the torque command value tr, taking the motor speed $\omega_m$ as a parameter. This technique is well known as an "a.c. motor vector control method", with the d-axis expressing an axis coincident with the rotational magnetic flux of the a.c. motor and the q-axis being an axis electrically orthogonal to this axis.

The voltage operation device 10 carries out current control in such a manner that a d-axis current id and a q-axis current iq become equal to the d-axis current command value idr and the q-axis current command value iqr, respectively, and outputs voltage command values Vur, Vvr and Vwr of phase U, phase V and phase W to the PWM generation device 11. The period of a carrier wave is also decided at the voltage operation device 10 and a periodic signal T is outputted to the carrier wave generating device 12.

The carrier wave generating device 12 outputs carrier waves Fcp and Fcn for the next one period based on the periodic signal T. The carrier waves Fcp and Fcn are used for generating PWM signals which switch an upper arm and a lower arm of the inverter 3. Further, interrupt signals P1 and P2 are generated at the time of the maximum value and minimum value of the carrier wave Fcp (Fcn) and a function exists for applying the interrupts in order to activate operations with respect to the voltage operation device 10.

The PWM generation device 11 calculates PWM signals Pup, Pvp and Pwp of each phase for the upper arm by comparing the voltage command values Vur, Vvr and Vwr and the carrier wave Fcp, and calculates PWM signals Pun, Pvn and Pwn of each phase for the lower arm by comparing the voltage command values Vur, Vvr and Vwr and the carrier wave Fcn.

Figure 2:
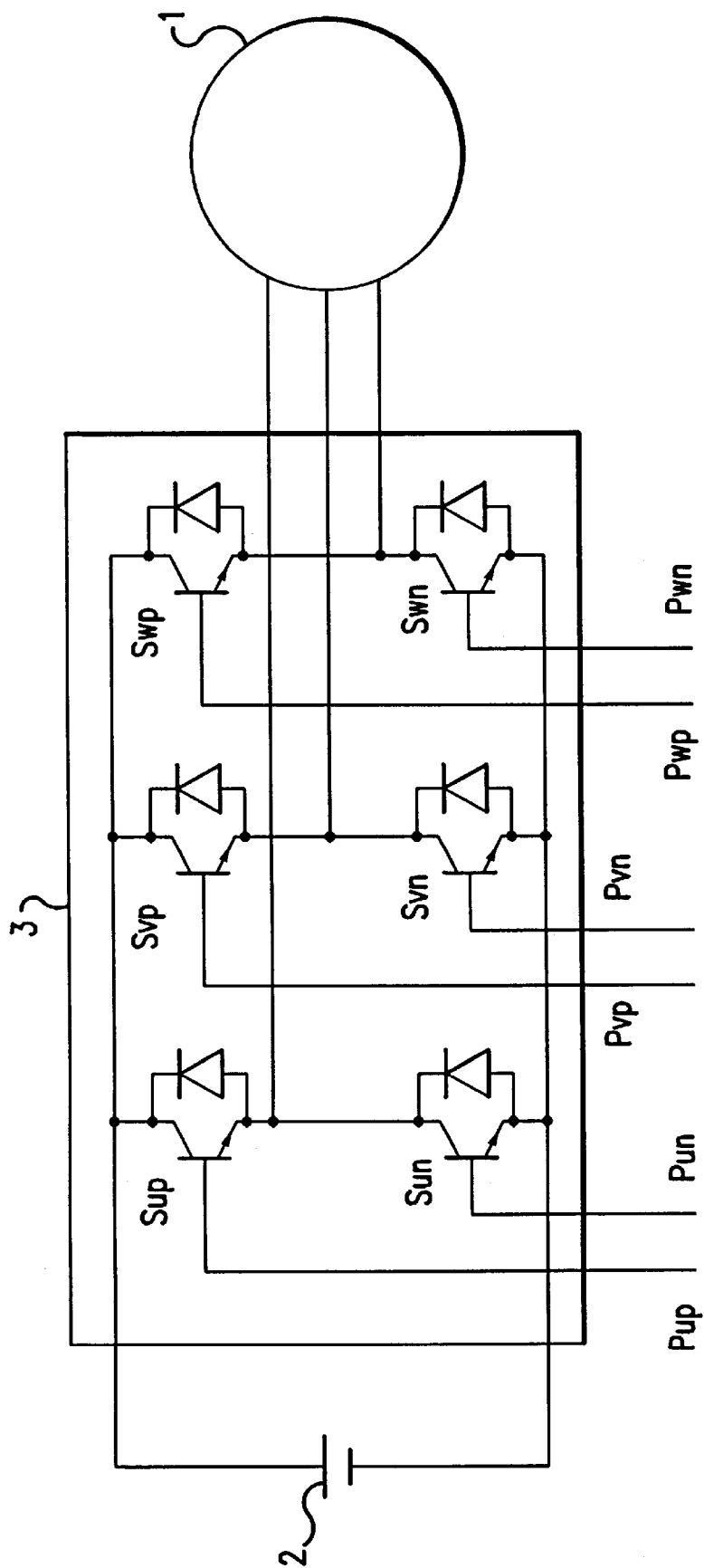
FIG. 2 is a circuit diagram showing the relationship of a main circuit of an inverter 3 and a PWM signal.

The inverter 3 is driven by these PWM signals. The relationship between switching elements Sup, Svp, Swp, Sun, Svn and Swn of this inverter 3 is shown in FIG. 2. This operation sequence is described in detail later. The synchronous motor 1 is driven at a prescribed torque using this configuration.

Next, the details of the voltage operation device 10 are described. The voltage operation device 10 is comprised of a current controller 13, a voltage setting part 14 and a mode setting part 15.

First, the current controller 13 obtains current in a direction coinciding with the magnetic pole position, i.e. d-axis current id, and current in a director orthogonal to this d-axis current id, i.e. g-axis current iq from the phase currents iu and iv using the magnetic pole position qm. Next, the difference between the d-axis current command value idr and the d-axis current id, and the difference between the q-axis current command value iqr and the q-axis current iq are calculated, a current control operation is carried out, and a d-axis voltage command value Vdr and a q-axis voltage command value Vqr are obtained. A voltage vector command absolute value Vr and a voltage vector command phase $\theta_m$ are then obtained from these command values. The relationship between these values is shown in the voltage vector diagram of FIG. 3.

Figure 3:
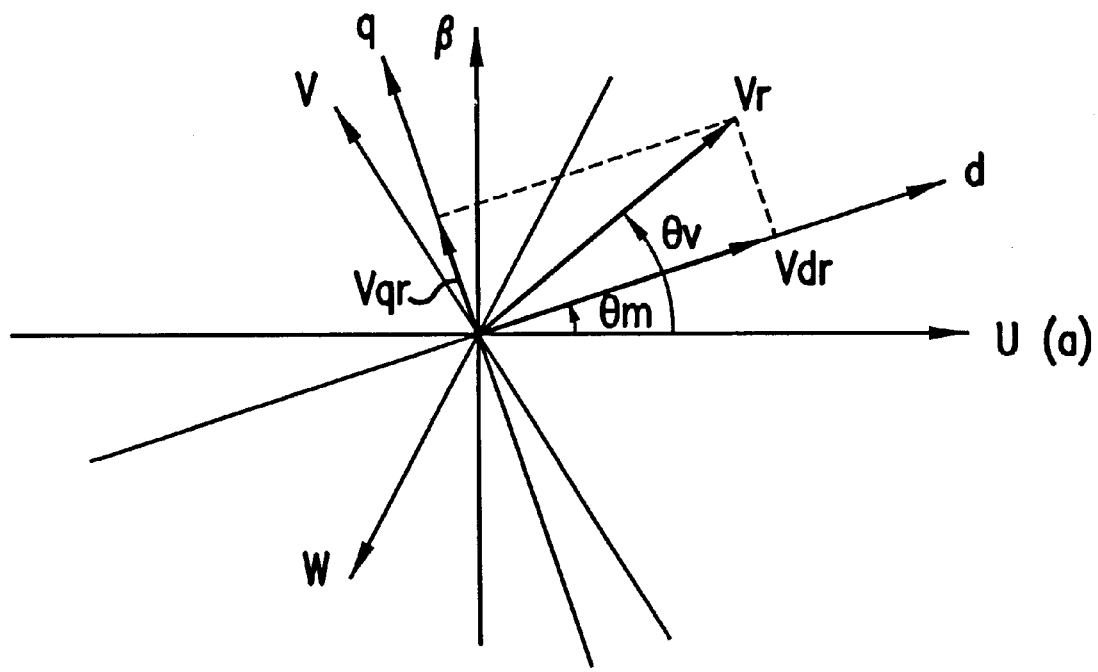
FIG. 3 is a vector diagram showing the relationship of positions of magnetic poles of a synchronous motor and voltage vectors.

The voltage vector command absolute value Vr and the voltage vector command phase $\theta_m$ are obtained from the vector diagram of FIG. 3 from the magnetic pole position $\theta_m$, d-axis voltage command values Vdr and the qoaxis command value Vqr.

The voltage operation device 10 initiates operationst using the interrupt signals P1 and P2 as described above, but the operations using the interrupt signal P1 are processed in the order of the current control operation of the current controller 13, the mode setting operation of the mode setting part 15 and the operation voltage setting 1 of the voltage setting part 14. A current control operation in synchronism with the carrier wave can therefore be performed by carrying out current control using this kind of interrupt.

In such a case, motor torque can be generated while carrying out current control even when the output voltage is in high frequency regions by introducing an algorithm that puts the carrier wave in synchronism with the output voltage.

Figure 5:
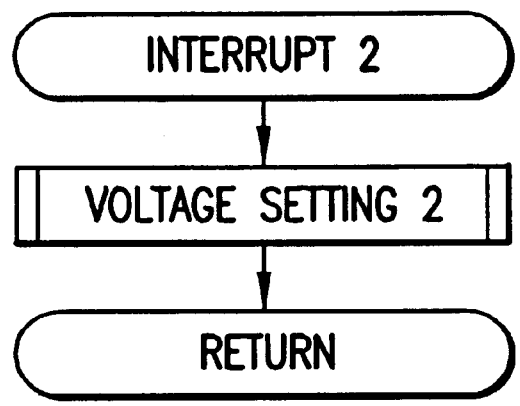
FIG. 5 is a flowchart showing processing of an interrupt task 2 activated by an interrupt pulse P2.
Figure 6:
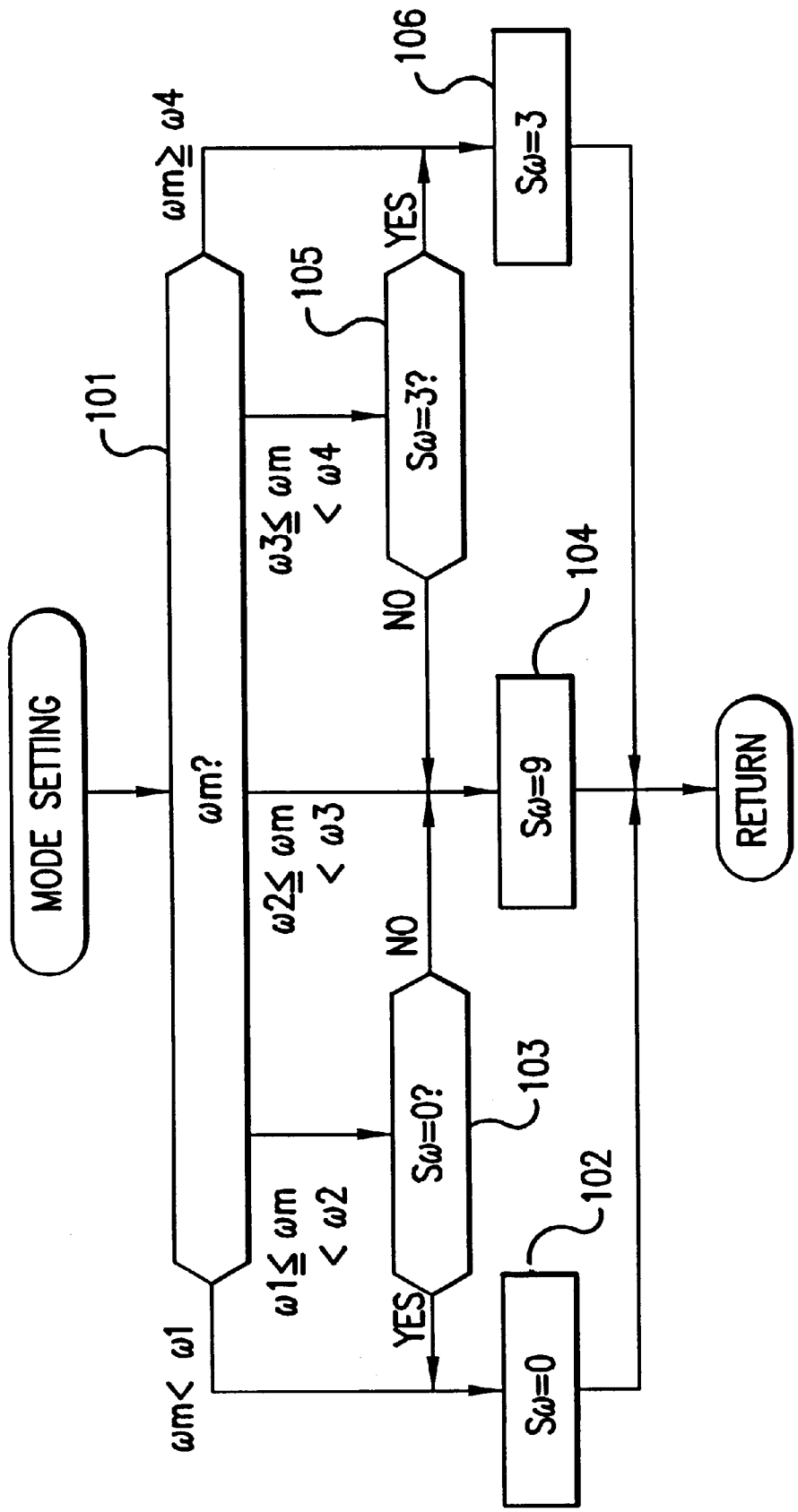
FIG. 6 is a flowchart of a mode setting operation carried out at a mode setting part 15 in the embodiment of FIG. 1.
Figure 8:
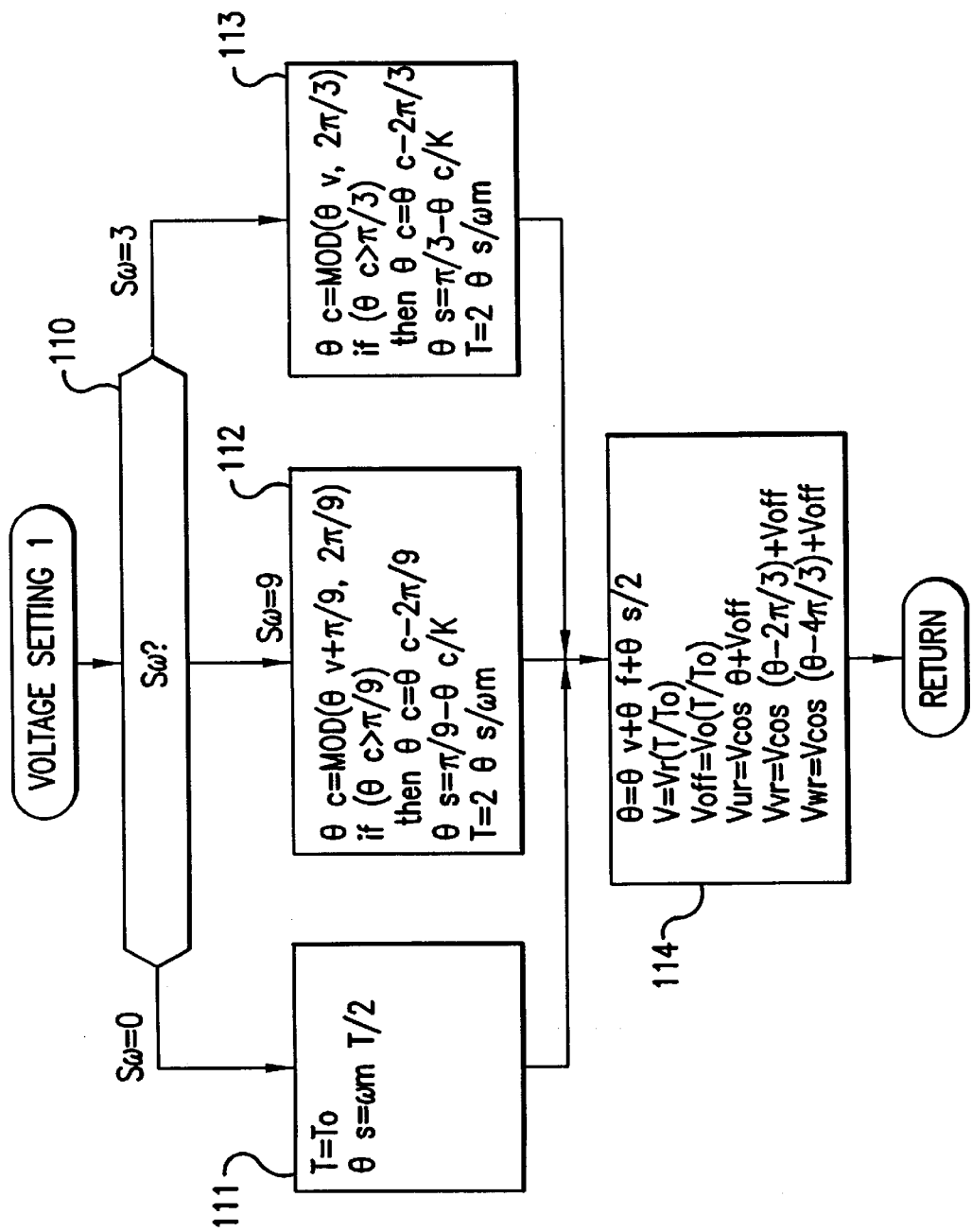
FIG. 8 is a flowchart of an operation, voltage setting 1, carried out by a voltage setting part 14 when an interrupt pulse P1 occurs in the embodiment of FIG. 1.
Figure 9:
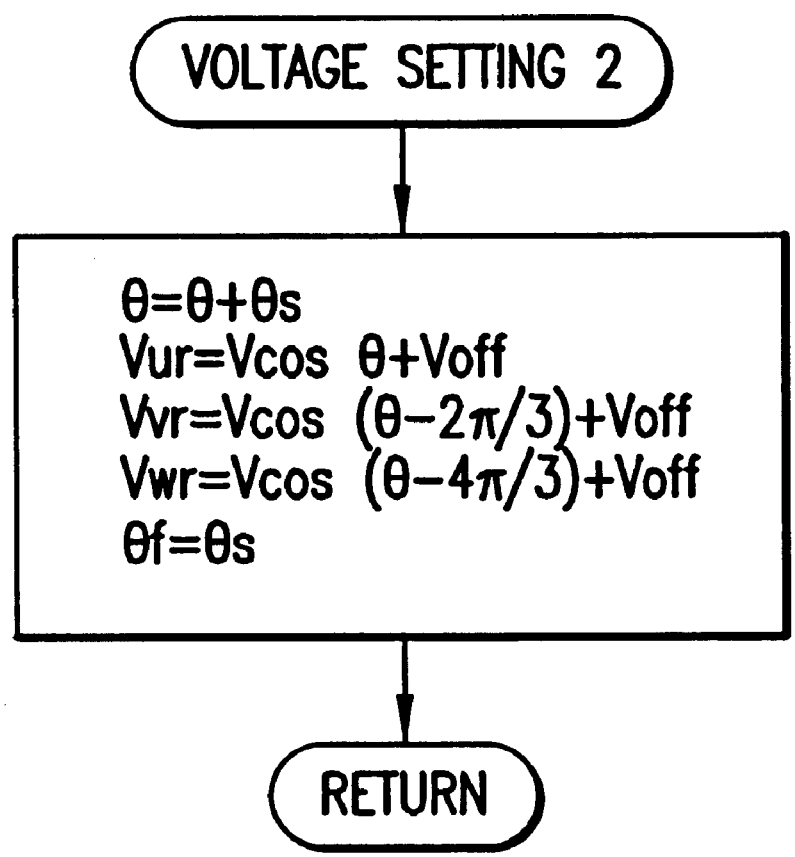
FIG. 9 is a flowchart of an operation, voltage setting 2, carried out by a voltage setting part 14 when an interrupt pulse P2 occurs in the embodiment of FIG. 1.
Figure 10A:
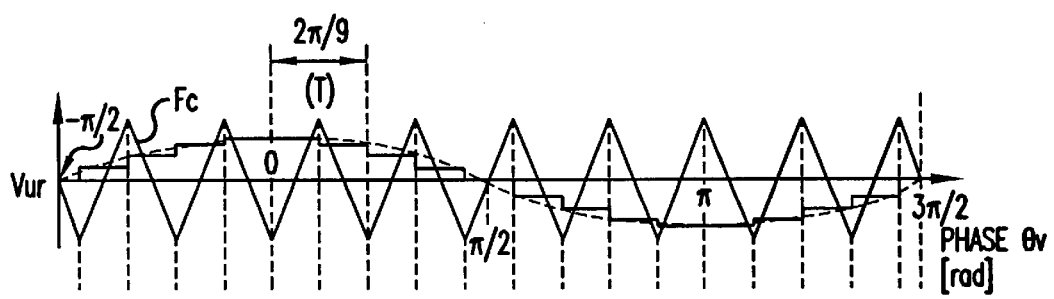
FIG. 10 is a timing diagram of a synchronous PWM signal when switching mode Sw=9.
Figure 10B:
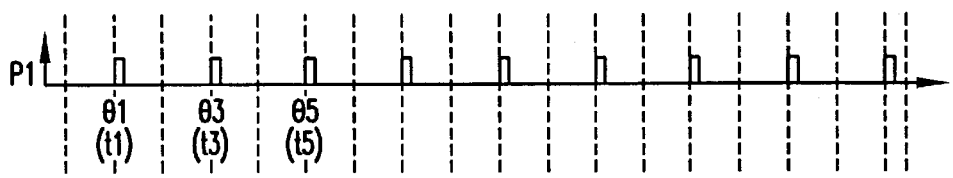
Figure 10C:
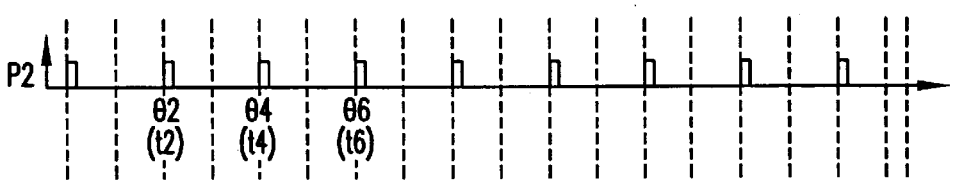
Figure 10D:
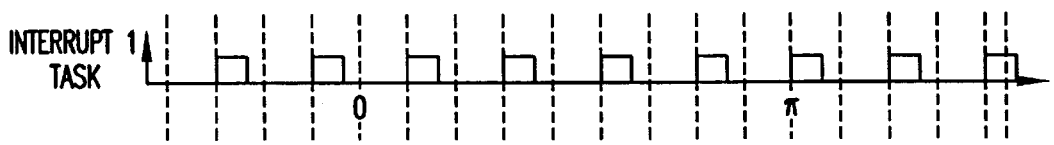
Figure 10E:
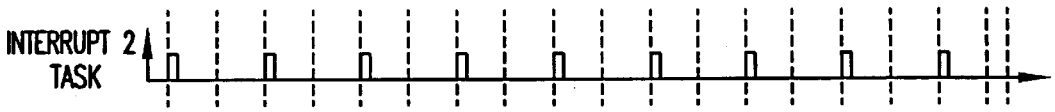
Figure 10F:
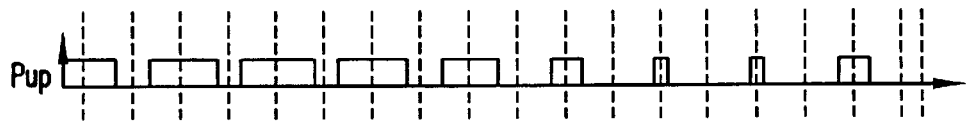
Figure 10G:
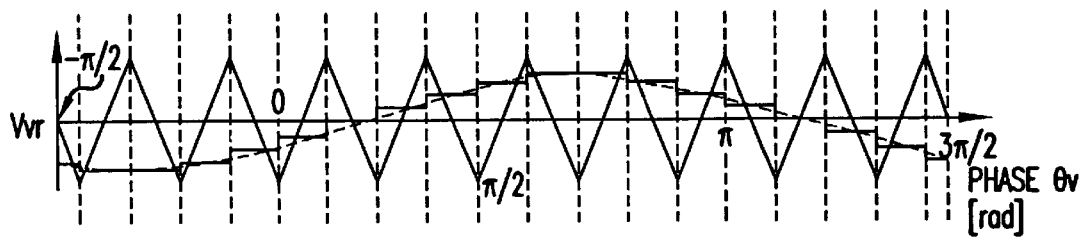
Figure 10H:
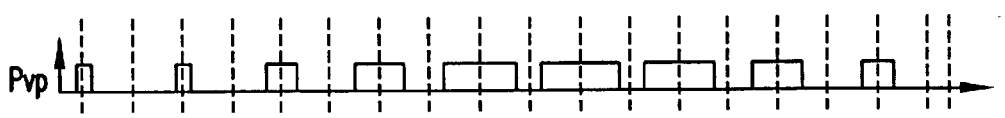
Figure 10I:
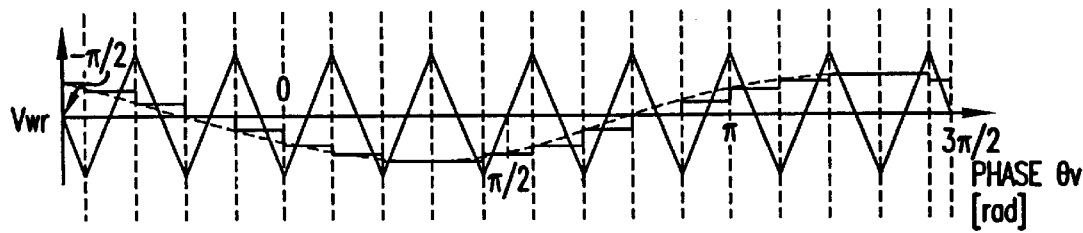
Figure 10J:
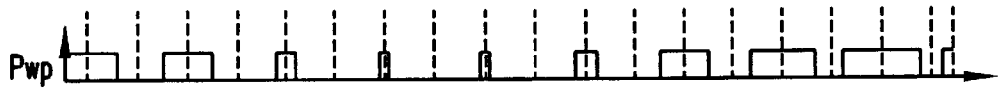
Figure 11A:
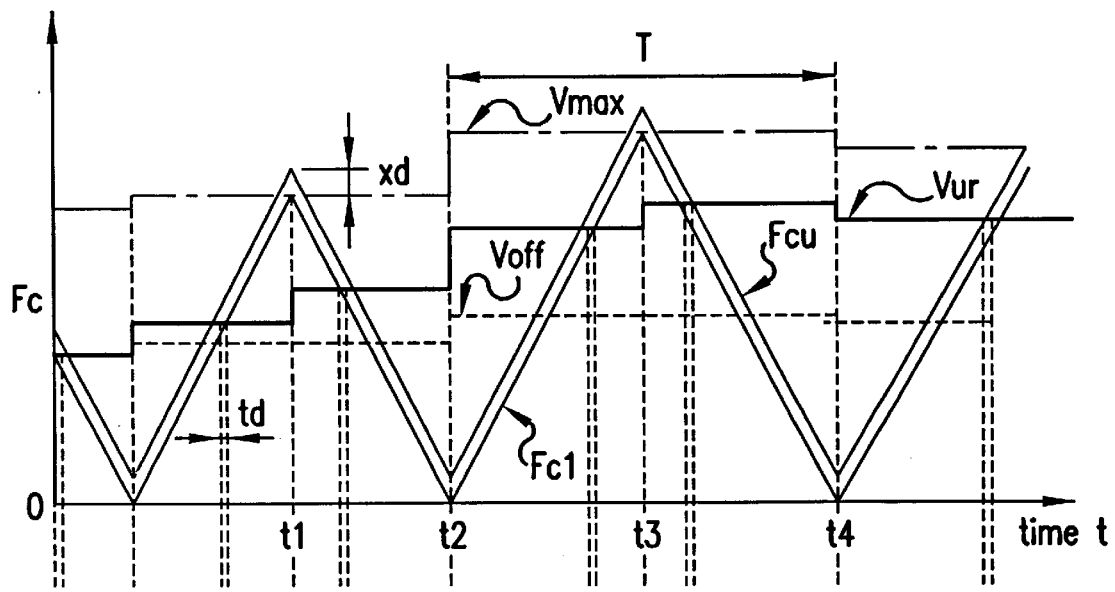
FIG. 11 is a timing diagram showing the relationship of the transfer period and voltage command value when the phase and period of the output voltage change.
Figure 11B:
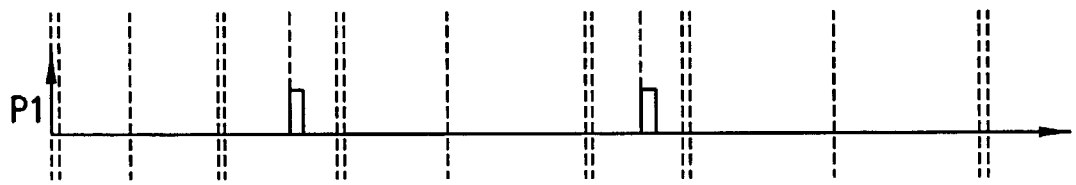
Figure 11C:
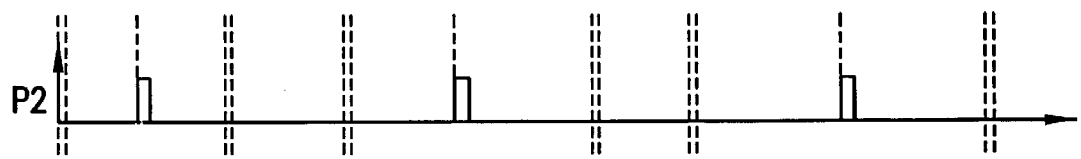
Figure 11D:
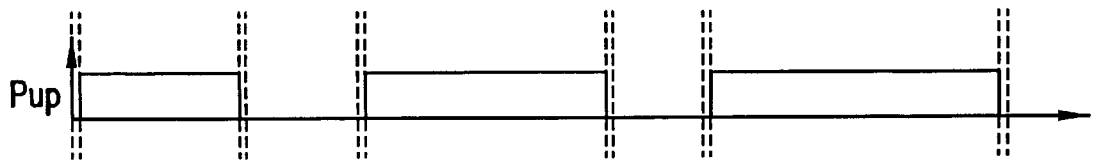
Figure 11E:
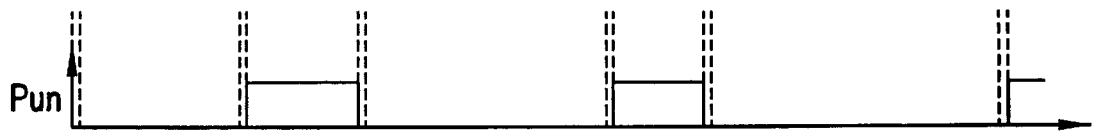
Figure 12A:
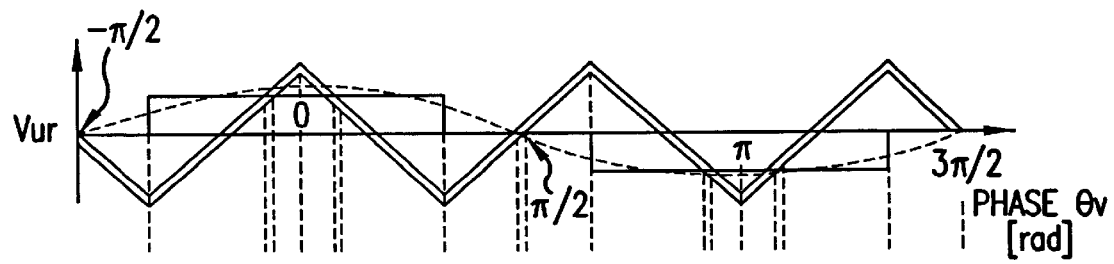
FIG. 12 is a liming diagram of the synchronous PWM signal when the switching mode Sw=3.
Figure 12B:
Figure 12C:
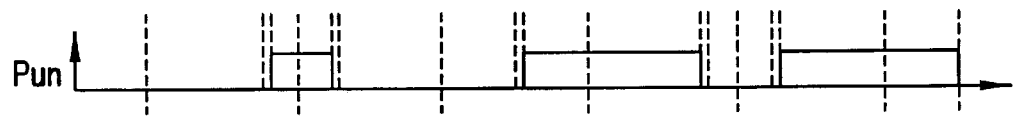
Figure 12D:
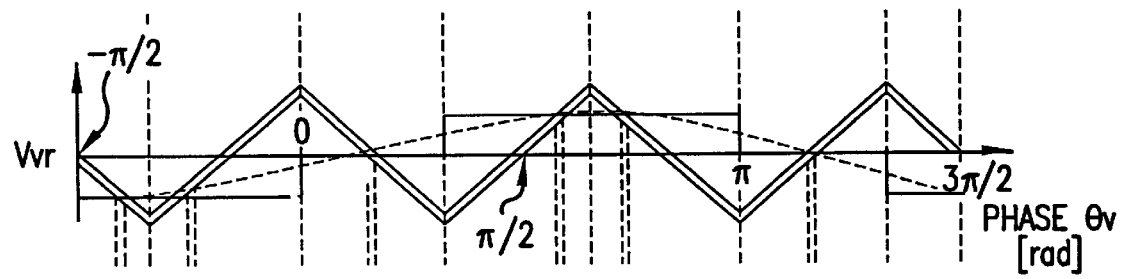
Figure 12E:
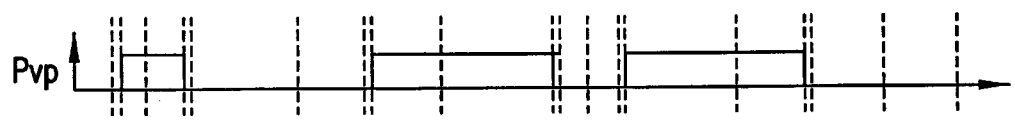
Figure 12F:
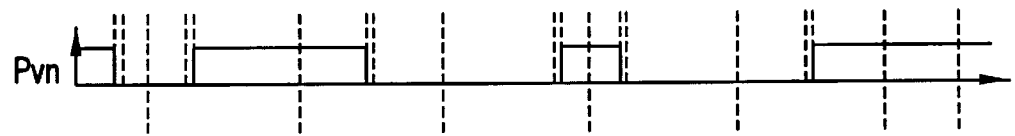
Figure 12G:
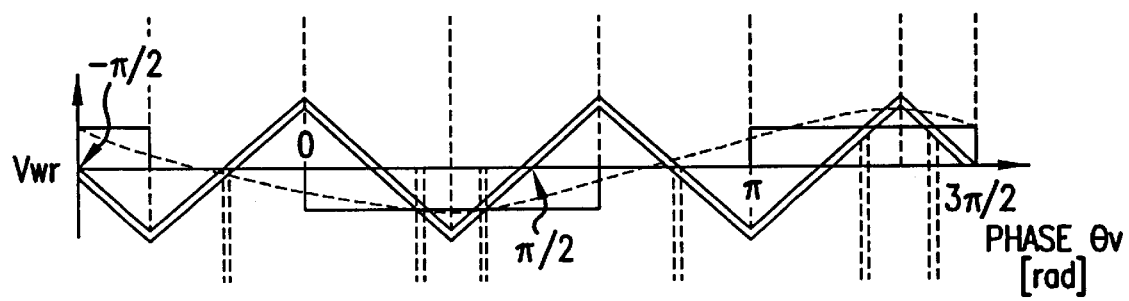
Figure 12H:
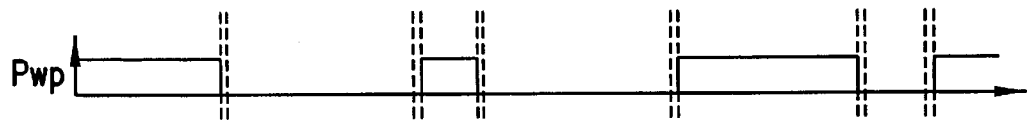
Figure 12I:

Details of the mode setting operation and the operation voltage setting 1 are shown in the flowcharts of FIG. 6 and FIG. 8. The operation when an interrupt signal P2 is generated is taken to be just the operation voltage setting 2 of the voltage setting part 14 as shown in FIG. 5. A flowchart for the operation voltage setting 2 is shown in FIG. 9. As a result, the current control operation is carried out once and the voltage setting operation is carried out twice for one period of the carrier wave. Sampling periods for the current control and the voltage setting therefore become one time and ½ times the carrier wave period, respectively.

The following is a description of the respective flowcharts.

The mode setting operation shown in FIG. 6 is for deciding the number of times switching operations are carried out per period of the output voltage using the motor speed $\omega_m$. If a switching mode Sw is 0, an asynchronous PWM method taking the carrier wave frequency to be fixed is selected regardless of the frequency of the output voltage. The carrier wave frequency is referred to as a "reference frequency" in this asynchronous PWM method. When Sw=n (where n≠0), a frequency of n-times the frequency of the carrier wave is set with respect to the frequency of the output voltage.

A description of the method for deciding this switching mode is described in FIG. 6. Step 101 branches to step 102 to 106 depending on the motor speed $\omega_m$ being from low speed to high speed.

When the motor speed $\omega_m$ is less than a speed $\omega_1$, where sufficiently stable current control can be carried out even with an asynchronous PWM method, S2 is taken to be 0 in step 102.

When the motor speed $\omega_m$ is an extremely high speed of speed $\omega_4$ or more where the carrier wave frequency cannot be made high, Sw is decided to be 3 in step 106.

If it is not a PWM method, preferred current control cannot be carried out, but if the motor speed is within an intermediate range such that the carrier frequency can be made approximately 9 times the frequency of the output frequency, i.e. $\omega_2 < \omega_m < \omega_3$, Sw is set to 9 in step 104.

In the case of the range of the intermediate motor speed, i.e. $\omega_1 < \omega_m < \omega_2$ and $\omega_3 < \omega_m < \omega_4$, the operations of step 103 and 105 are carried out so as to give hysteresis due to the switching mode Sw of the previous time.

Figure 7:
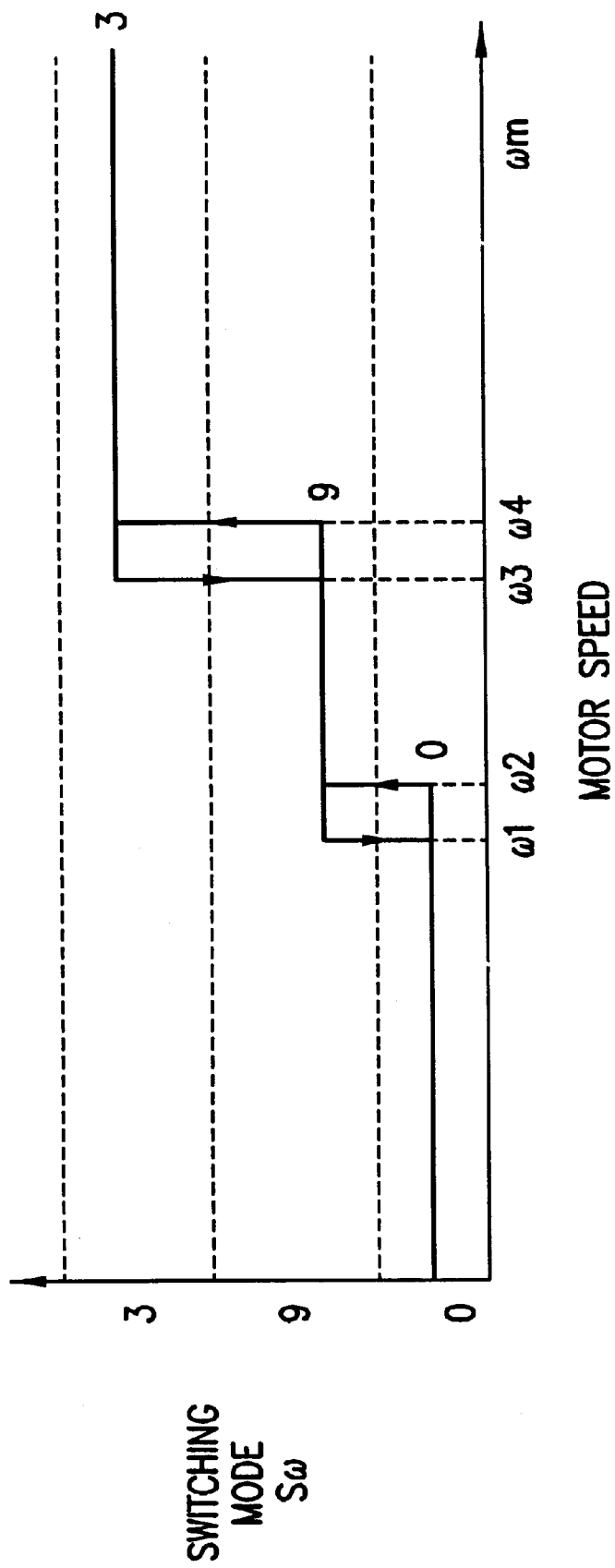
FIG. 7 is a characteristic drawing showing the relationship of motor speed w, decided by the mode setting operation of FIG. 6 and a switching mode.

Expressing this as a graph, the relationship between the motor speed $\omega_m$ and the switching mode Sw is as shown in FIG. 7. In doing so, frequent changing over of the switching mode Sw can be prevented and smooth transitions can be achieved.

Next, the operation voltage setting 1 carried out at the voltage setting part 14 is described using the flowchart of FIG. 8.

The operation for the carrier wave period T is first carried out based on the switching mode Sw obtained at the mode setting part 15. In order to do this, the switching mode Sw is determined in step 110, with the process branching to steps 11, 112 or 113 for Sw=0, 9 or 3, respectively.

When Sw=0, the carrier wave period T is put to a fixed value T0 in step 111. As the motor speed $\omega_m$ is comparatively low at this time it is not necessary to consider beat phenomena in the current control system and an asynchronous PWM method is acceptable. As the sampling period the voltage setting is ½ of the carrier wave period T, the sampling phase $\theta_s$ compensating for the sampling time can be obtained from $\omega_m(T/2)$.

In this respect, when Sw=9, one period of the output voltage is divided by 9 and it is necessary to obtain a carrier wave for generating the PWM signal.

In step 112, whether or not a current voltage vector command phase $\theta_v$ is of a prescribed phase that is the output voltage divided by 9 is obtained using a compensation phase $\theta_c$. If the voltage vector command phase $\theta_v$ is $n\pi/9$ (where n is an integer), a PWM signal taking a maximum value of a sinusoidal output as center is symmetrical but the PWM signals for the upper arm and lower arm can be taken to be the same waveforms with a phase difference therebetween of 180 degrees. Whether $\theta_v$ is $(2m+1)\pi/9$ (where m is an integer).

If the compensation phase $\theta_c$ is 0 in this operation, the existence of a PWM signal of the original period is indicated. When this is not the case, the compensation phase $\theta_c$ can be operated upon in such a manner as to gradually approach 0.

When the compensation phase $\theta_c$ is greater than $\pi/9$, $2\pi/9$ is subtracted from $\theta_c$ so as to give a negative value. In doing the above, the sampling phase $\theta_s$ is reduced by $\theta_c/K$ (where K is an integer set to a value of, for example, 4 to 50) from an original $\pi/9$ in such a manner that the compensation phase $\theta_c$ gradually approaches zero.

Generation of a carrier wave in synchronism with the phase of a voltage command value in order to carry out current feedback control is generally difficult but current control can be achieved using a synchronous PWM method employing a carrier wave by gradually correcting phase shifts.

Compensation depending on the timing of the taking in of the magnetic pole position $\theta_m$ is not carried out here but time-divided phase can be compensated as necessary. As a sampling phase $\theta_s$ is decided beforehand is step 112, the carrier wave period T can be obtained using $2\theta_s/\omega_m$ based on this sampling phase $\theta_s$.

Similarly, when Sw=3, the voltage vector command phase $\theta_v$ can be taken to be $\pi/3$ (where n is an integer) in step 113. Operations are then carried out in such a manner as to give $2m\pi/3$ (where m is an integer) and the sampling phase $\theta_s$ and the carrier wave period T are calculated.

Next, in step 114, an output phase $\theta$ is obtained as the sum of half of the voltage vector command phase $\theta_v$, a sampling phase $\theta_f$ for the previous time, and the sampling phase $\theta_s$ for the current time.

As $\theta_v$ is a value based on the magnetic pole position $\theta_m$ for when the calculation starts and $\theta_f$ is the phase shift until the results of this calculation are actually set, it is necessary to add these values. However, as it is necessary for the average voltage for the next sampling time to coincide with the results of the current calculation, this object can be achieved by further adding $\theta_s/2$.

It is also necessary to correct the voltage command value using the carrier wave period T. Because the method using a counter is most effective with a digital circuit, when the carrier wave generating device 12 makes the carrier wave period T large, the amplitude of the carrier wave also becomes large. It is therefore necessary to change the voltage vector command absolute value Vr relative to the carrier wave period T using the equation V=Vr (T/T0).

An offset voltage Voff required for comparisons with the carrier wave is also calculated from V0 (T/T0) (where V0 is a reference offset voltage when T=T0). The voltage command values Vur, Vvr and Vwr for each phase are therefore obtained from the equations shown in step 114 of FIG. 8.

On the other hand, a flowchart of the operation voltage setting 2 of the voltage setting part 14 carried out using the interrupt signal P2 is shown in FIG. 9.

There is no current control operation carried out here and the carrier wave period T therefore has the same value as when an operation is carried out using the interrupt signal P1, and the sampling phase $\theta_s$ can simply be added to the output phase $\theta$.

The voltage command values Vur, Vvr and Vwr for each phase are calculated based on this value. $\theta_s$ is therefore taken to be $\theta_f$ so that the sampling phase $\theta_s$ for the current time becomes equal to the sampling phase $\theta_f$ for the previous time when the next interrupt signal P1 occurs.

In the above, a description is given from the point of view of system configuration, with synchronous PWM method current control being achieved while using a carrier wave in this operation sequence.

This operation will now be described in more detail based on time changes using a timing diagram of FIG. 10.

FIG. 10 is a timing diagram for the switching mode Sw=9. The U-phase voltage command value Vur is a maximum when the voltage vector command phase $\theta_v$ is 0 (phase $\theta_4$ (time t4) but at this time, the phases of the voltage command Value and the carrier wave are in synchronism so that the carrier wave Fc (meaning Fcp and Fcn occurring in FIG. 1) becomes a minimum. This is then achieved by the compensation phase $\theta_c$ converging to zero as described by the flowchart of FIG. 8.

Figure 4:
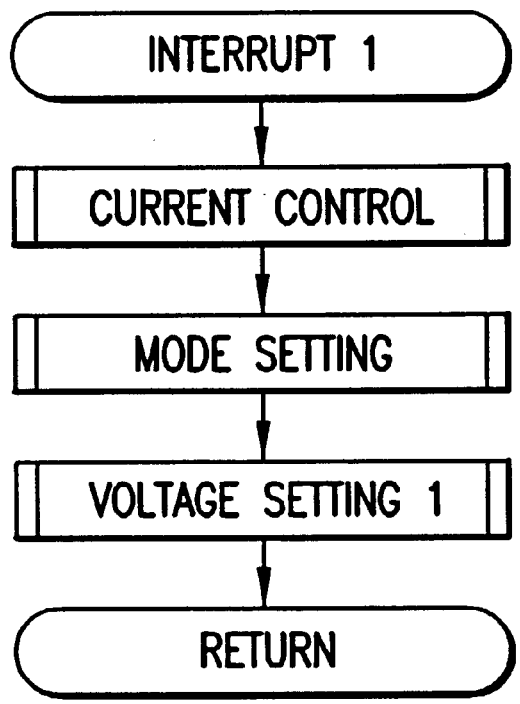
FIG. 4 is a flowchart showing processing of an interrupt task 1 activated by an interrupt pulse P1.

The interrupt signals P1 and P2 are respectively generated when the carrier wave Fc is a maximum and minimum value. Interrupt task 1 and interrupt task 2 are then activated by these interrupt signals P1 and P2 and the process described in FIG. 4 and FIG. 5 is carried out.

For example, the carrier wave period T obtained in task 1 processed using the interrupt signal P1 generated at phase $\theta_1$ (time t1) is calculated and set to the carrier wave generating device 12 at the time of a phase $\theta_2$ (time t2). At the same time, the voltage command values Vur, Vvr and Vwr are also set to the PWM generation device 11 and reflected to the PWM signal for a section from phase $\theta_2$ (time t2) phase $\theta_3$ (time t3).

Because of this, as described in FIG. 8, the sampling phase $\theta_f$ of the previous time for compensating the phase from activation of the input task until the voltage command value is set, and ½ of the sampling phase Qs of the previous time for compensating the phase from the voltage command value being set until actual coincidence with the average voltage of the converter are added to the voltage vector command phase $\theta_v$ so as to give the output phase $\theta$.

The operation depending on the interrupt signal P2 generated at the phase $\theta_2$ (time t2) is as follows. The interrupt task 2 is started and the process of FIG. 5, i.e. the process of FIG. 9, is carried out. The voltage command values Vur, Vvr and Vwr are then set to the PWM generation device 11 at the phase $\theta_3$ (time t3) and reflected at the PWM signal for the section from phase $\theta_3$ (time 3) to the phase $\theta_4$ (time t4)

The operation results obtained in the interrupt task 1 of phase $\theta_1$ (time t1) are used as is at the carrier wave period T as there are no calculations performed using the interrupt task 2.

The PWM signals Pup, Pvp and Pwp for each of the phases shown in FIG. 10 can be obtained using this process.

By adopting this system configuration, the load on the software processing required for arithmetic processing for current control etc. can be reduced while the voltage waveforms for each phase can be made close to being sinusoidal waveforms using Pwm signals. Control devices can therefore be made using inexpensive microprocessors with few ripples occurring in any resulting control system.

FIG. 11 is a timing diagram showing the details of the relationship of the voltage vector command phase $\theta_v$ from the results of the current control calculations and the carrier waves Fcp and Fcn, voltage command value Vur and carrier wave period T when the period of the output voltage is changed.

The carrier waves Fcp and Fcn are triangular waves usually having a fixed difference xd for guaranteeing the dead time td for the PWM signal. A maximum voltage setting value Vmax is then set by the carrier wave generating device 12 taking into consideration the carrier wave period T.

The carrier waves Fcp and Fcn are incremented or decremented every fixed time period. For example, when incrementing proceeds for the carrier wave Fcn so that there is coincidence at a time t1 with the maximum voltage setting value Vmax, the interrupt signal P1 is generated. Decrementing then continues until Fcn becomes 0 and the operation for interrupt task 1 is made to start.

The interrupt signal P2 is then generated at a time t2 where the carrier wave Fcn becomes 0 and a carrier wave period T calculated in the interrupt task 1 is inputted to the carrier wave generating device 12. The maximum voltage setting value Vmax is then set based on this carrier wave period T. The maximum voltage setting value Vmax is then set from the carrier wave period T using a proportional operation because the actual carrier wave period is proportional to the maximum voltage setting value Vmax.

At this time, the voltage command values (only Vur of which is shown in FIG. 11) for each phase set simultaneously at the PWM generation device 11 are taken to be values taking into consideration the maximum voltage setting value Vmax reflecting changes in the carrier wave period T and the offset voltage Voff.

As described above, the configuration is such that PWM control is carried out with extremely fine changes in the carrier wave period T in a transitionary state of current control and with PWM signals being generated in synchronism with the phase of the output voltage in a steady state. Synchronous PWM control can therefore be achieved using carrier waves while carrying out high-frequency current control.

FIG. 12 is a timing diagram for when the switching mode Sw=3. As in the case where Sw=9 shown in FIG. 10, the phase of carrier waves Fcp and Fcn are put into synchronism with the phases of the voltage command values Vur, Vvr and Vwr by carrying out the process of FIG. 8.

When controlling using the operation of step 113 of FIG. 8, the carrier wave values are a maximum when the voltage vector command phase $\theta_v$ is 0, $2\pi/2$ and $4\pi/3$. The average voltage of the PWM signal can therefore be made large in a smooth manner in accordance with increases in the magnitude of the voltage command values.

In this embodiment, an output current can be controlled to be a prescribed sinusoidal waveform even at frequencies higher than 1/10 that of the carrier wave frequency using an inexpensive control device that uses carried waves to generate PWM signals so that a motor control device of superior torque response can therefore be provided.

Further, if the carrier frequency is the same, the frequency can be made higher than the highest output frequency of the inverter so that with permanent magnetic-type synchronous motors in particular, the size of the magnet used can be reduced, and the costs can be reduced accordingly.

Second Embodiment

Figure 13:
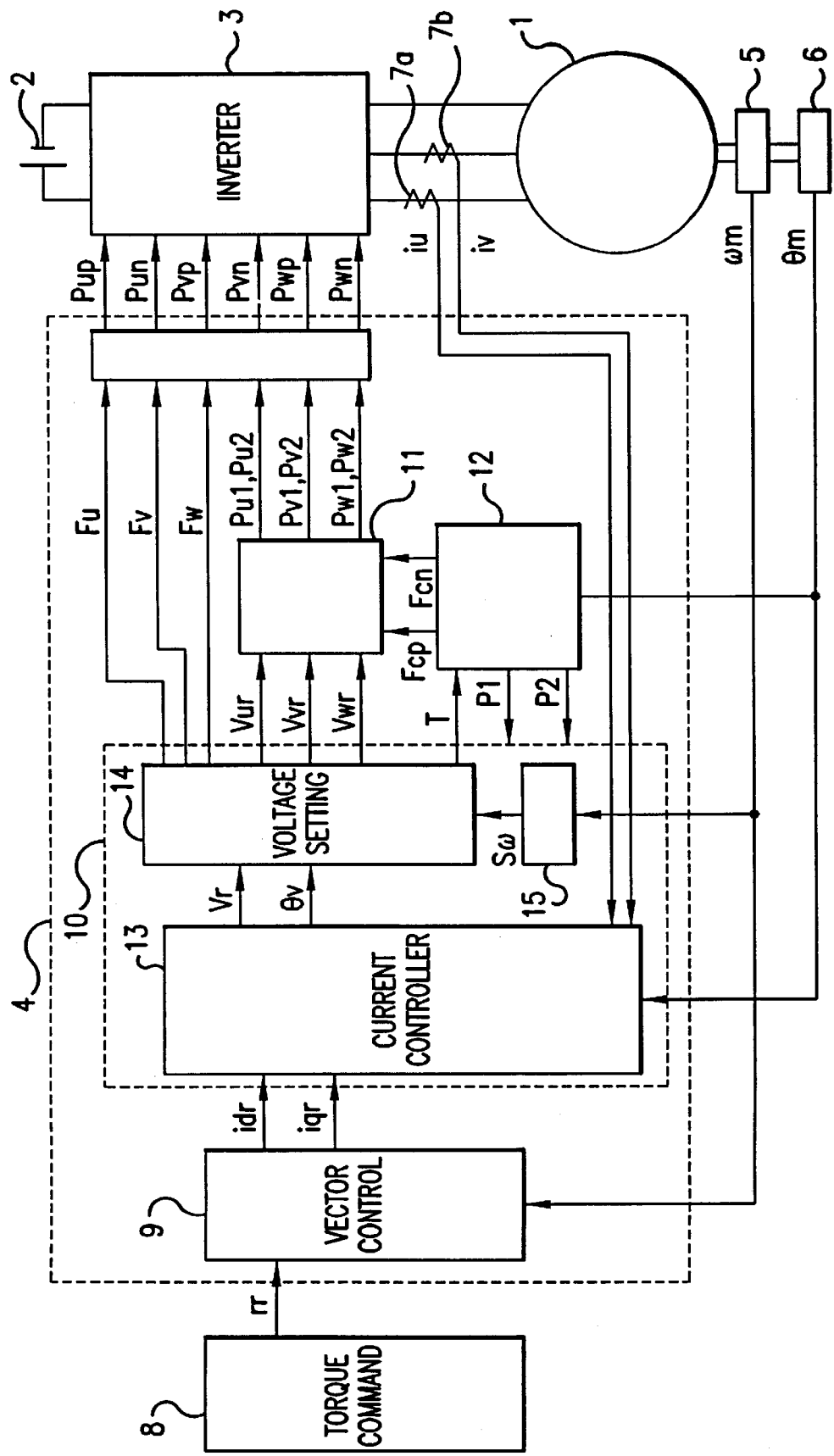
FIG. 13 is a view showing the configuration of the mode for driving the synchronous motor using switching mode Sw=6 in a further embodiment of the present invention.

FIG. 13 is a view of an embodiment of a motor control device for controlling current using a synchronous PWM signal where the carrier wave frequency is an even multiple (6 times) of the output frequency of the inverter. Here, the point of distinction with the first embodiment of FIG. 1 is that a PWM signal switching circuit 16 is added in FIG. 13. The contents of the processing carried out at the voltage setting part 14 and the mode setting part 15 within the voltage operation device 10 is also modified with respect to FIG. 1.

Figure 14:
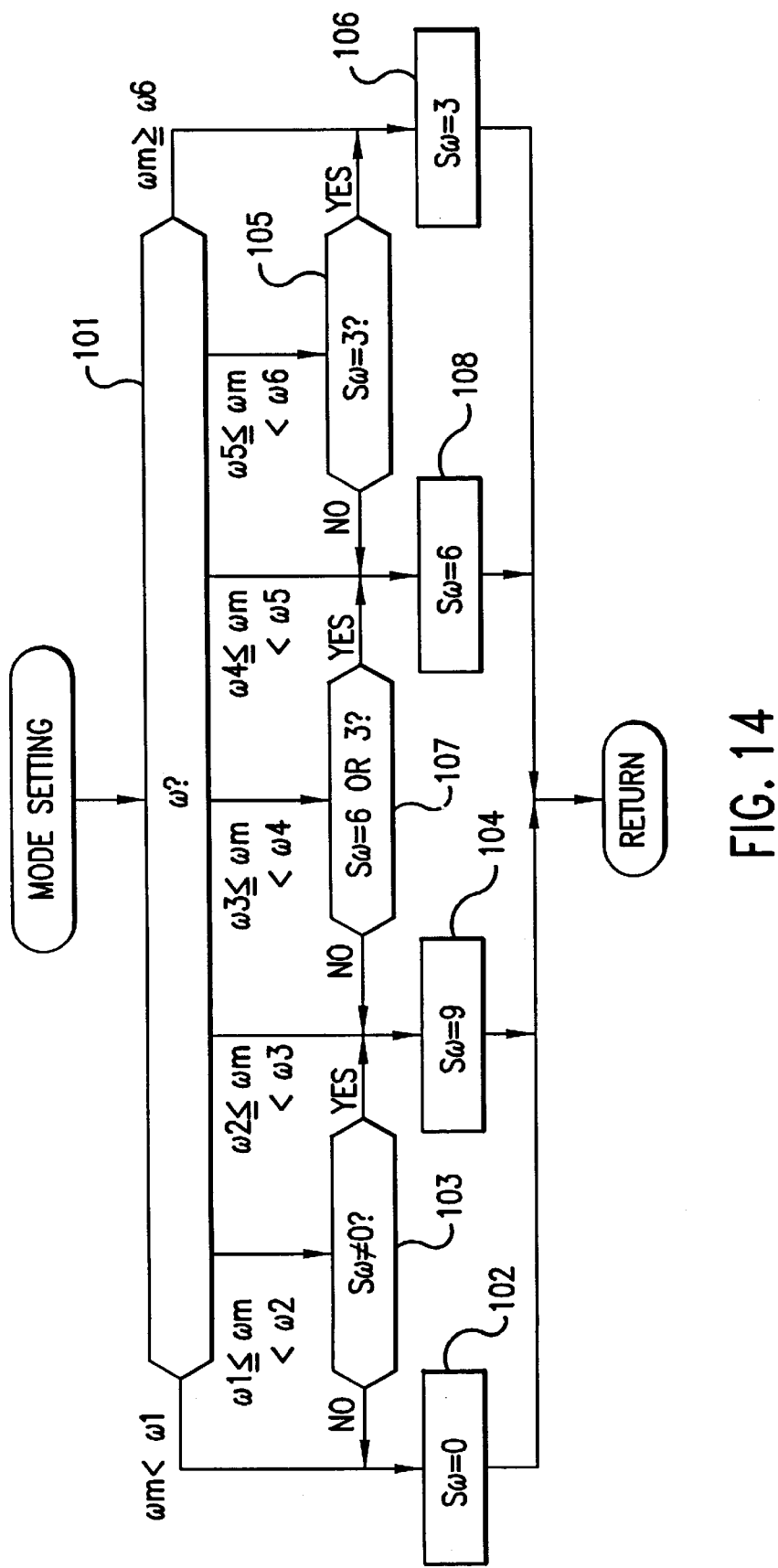
FIG. 14 is a flowchart showing a mode setting operation carried out at the mode setting part 15 in the embodiment of FIG. 13.
Figure 15:
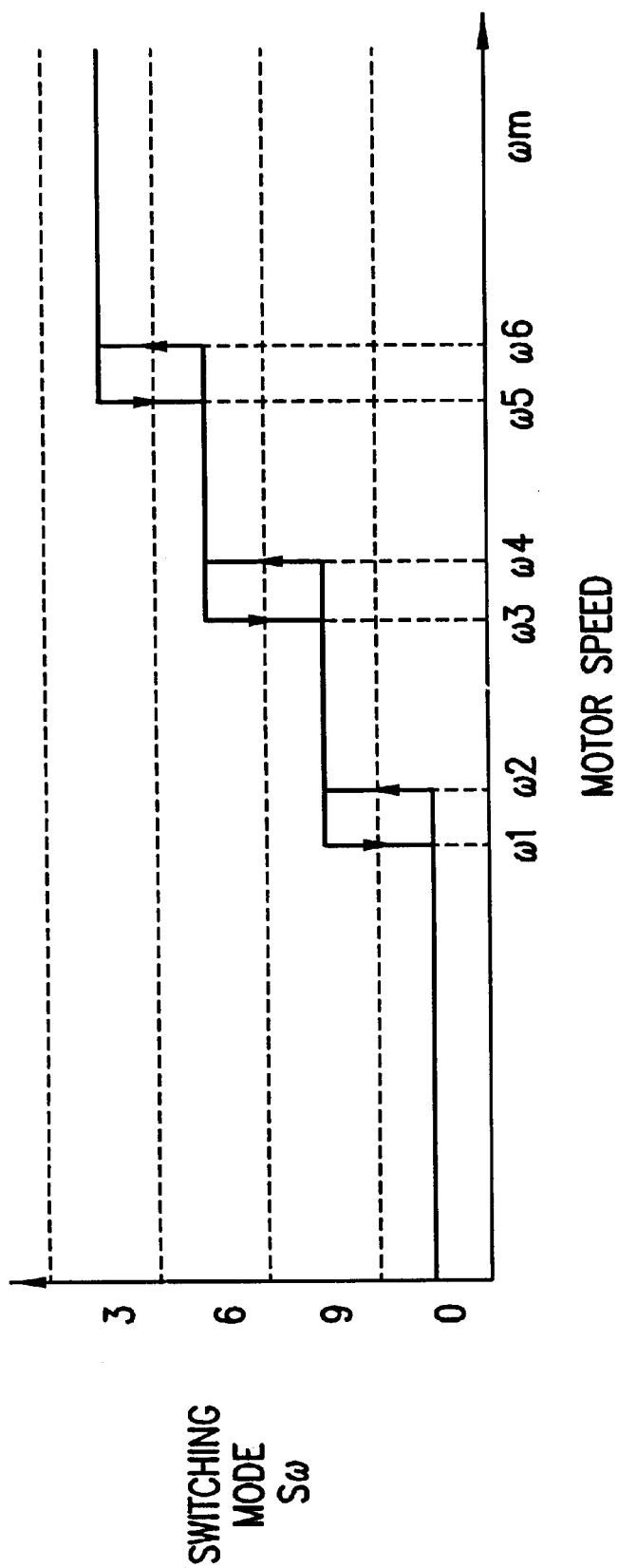
FIG. 15 is a characteristic drawing showing the relationship of a motor speed $\omega_m$ decided by the operation of FIG. 14 and the switching mode.

First, the process of the flowchart shown in FIG. 14 is carried out in place of the process of FIG. 6 at the mode setting part 15. In FIG. 14, a process for providing at a section where Sw=6, i.e. a step 107 and step 108, is added between the switching modes Sw=3 and Sw=9. In this way, as shown in FIG. 15, Sw=6 within the range of $\omega_m$ from $\omega_4$ to $\omega_5$. Further, the switching mode Sw is decided for within the ranges $\omega_3$ to $\omega_4$, and $\omega_5$ to $\omega_6$ while maintaining a hysteresis characteristic.

In the first embodiment, the high-frequency component of the waveform for the output current rapidly changes by three times while th switching mode Sw switches from 9 to 3 because the switching frequency is reduced by 1/3. However, the amount of change of the high-frequency component is reduced in this second embodiment by introducing a switching mode Sw=6 at the center.

FIG. 13 differs from FIG. 1 in that the switching mode Sw=6 is inputted at the voltage setting part 14 and in that voltage signal signals Fu, Fv and Fw for each phase are outputted.

Figure 16:
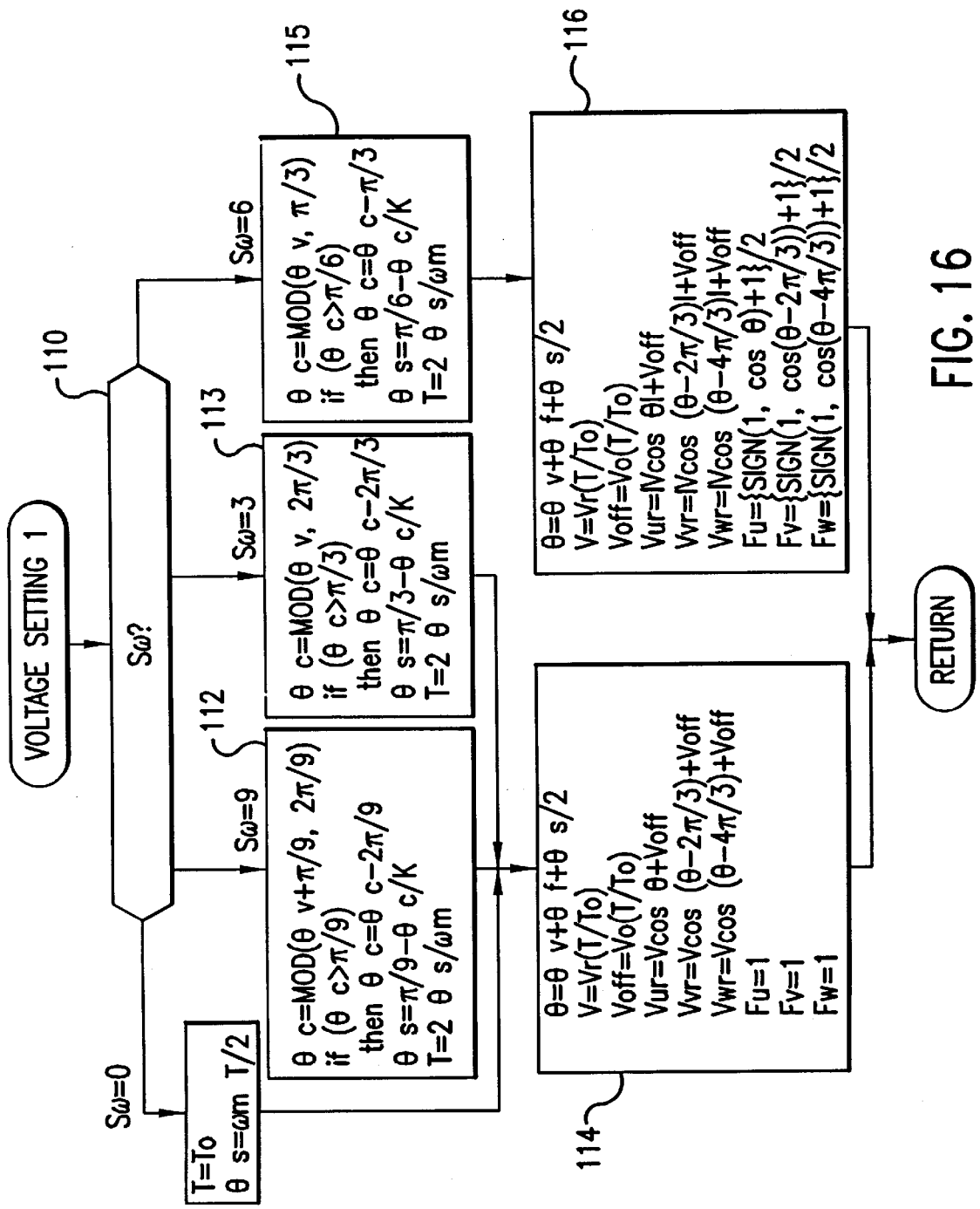
FIG. 16 is a flowchart of an operation, voltage setting 1, carried out at the voltage setting part 14 when an interrupt pulse P1 occurs in the embodiment of FIG. 13.
Figure 17:
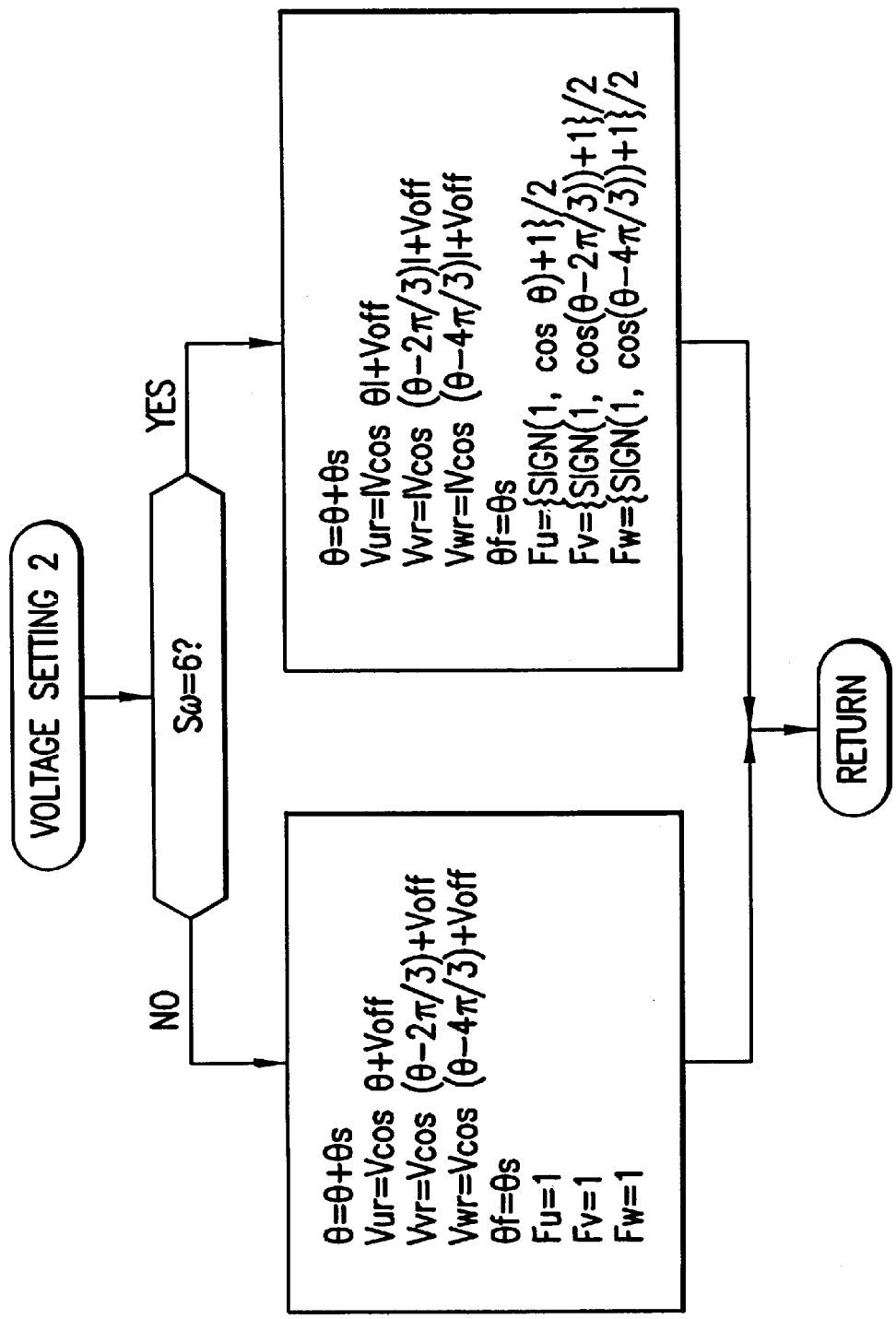
FIG. 17 is a flowchart of an operation, voltage setting 2, carried out at the voltage setting part 14 when an interrupt pulse P2 occurs in the embodiment of FIG. 13.

The process of the voltage setting part 14 is carried out during the interrupt tasks 1 and 2 activated by the interrupt signals P1 and P2, with the contents of the respective processes being shown in FIG. 16 and FIG. 17.

FIG. 16 differs from FIG. 8 in that in that voltage signal signals Fu, Fv and Fw for each phase are set to 1 in step 114 and in that step 115 and 116 are added.

Here, the values 1 and 0 for the voltage signal signals Fu, Fv and Fw mean "switching" and "no switching", respectively. In the step 114, the switching mode Sw is 3 or 9. The voltage signal signals Fu, Fv and Fw are set to 1 as with the first embodiment of FIG. 8.

A description will now be given for when Sw is determined to be equal to 6 in step 110 and the processing of step 115 and 116 is carried out.

The compensation phase $\theta_c$ is obtained in steps 115 and 116 in the same way as in step 112 and step 113 in order to generate a carrier wave where one period of the output voltage is divided by 6, with the sampling phase $\theta_s$ then being corrected using the compensation phase $\theta_s$ so that the compensation phase $\theta_c$ approaches 0. The process for calculating the carrier wave period T, output phase $\theta$, corrected voltage V and offset voltage Voff from the sampling phase $\theta_s$ is the same as for steps 113 and 114.

The adding of the offset voltage Voff to absolute values for sine waves for the voltage command values Vur, Vvr and Vwr is also a point of difference with the other switching modes.

Further, the voltage signal signals Fu, Fv and Fw are set to one when the sine wave sign is positive and 0 when the sine wave sign is negative.

The same processing is also carried out in the operation (voltage setting 2) of the voltage setting part processed in interrupt task 2 shown in FIG. 17 as is described for the case of switching mode Sw=6 in FIG. 16.

Figure 18:
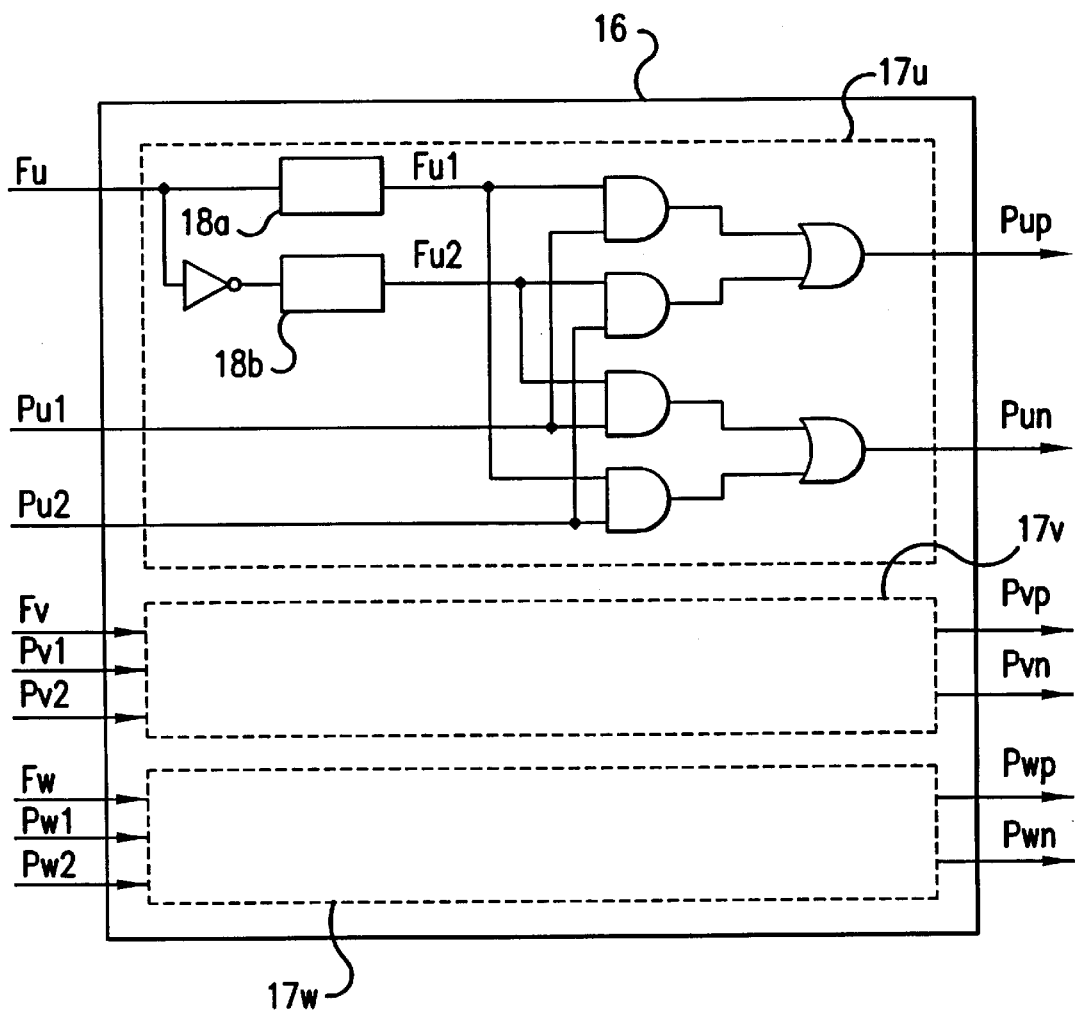
FIG. 18 is a circuit diagram showing a configuration of a PWM signal switching circuit 16.
Figure 19A:
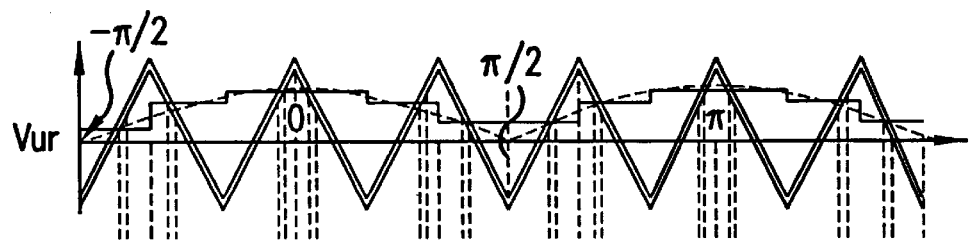
FIG. 19 is a timing diagram for a synchronous PWM signal when the switching mode Sw=6 in the embodiment of FIG. 13.
Figure 19B:
Figure 19C:
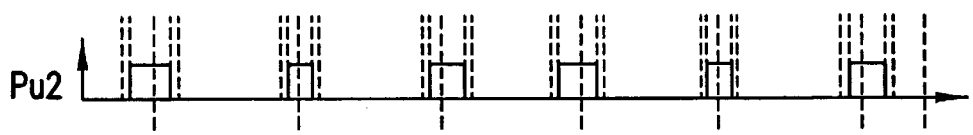
Figure 19D:
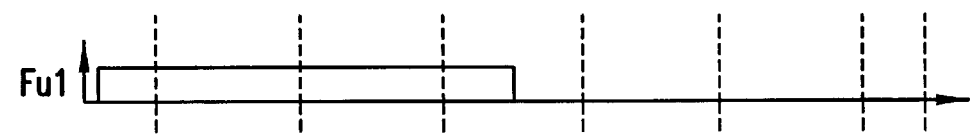
Figure 19E:
Figure 19F:
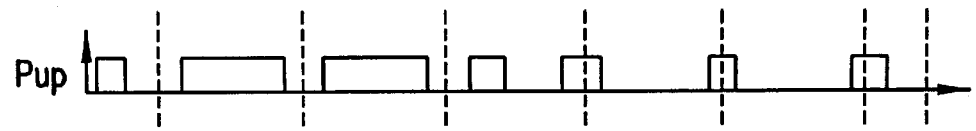
Figure 19G:
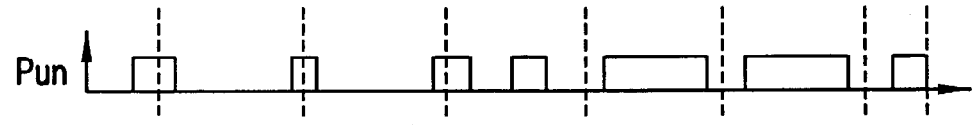
Figure 19H:
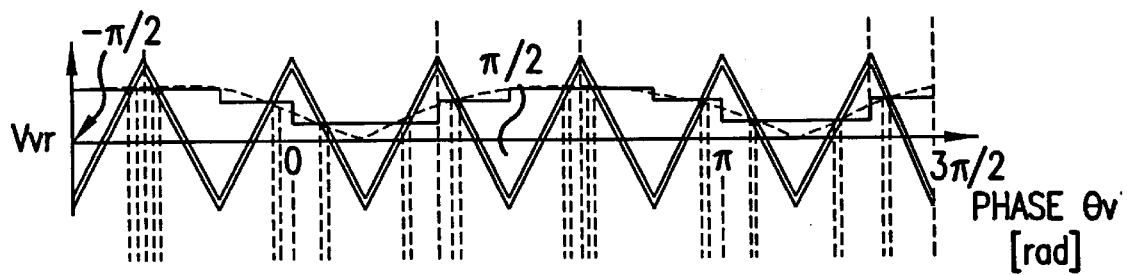
Figure 19I:
Figure 19J:
Figure 19K:
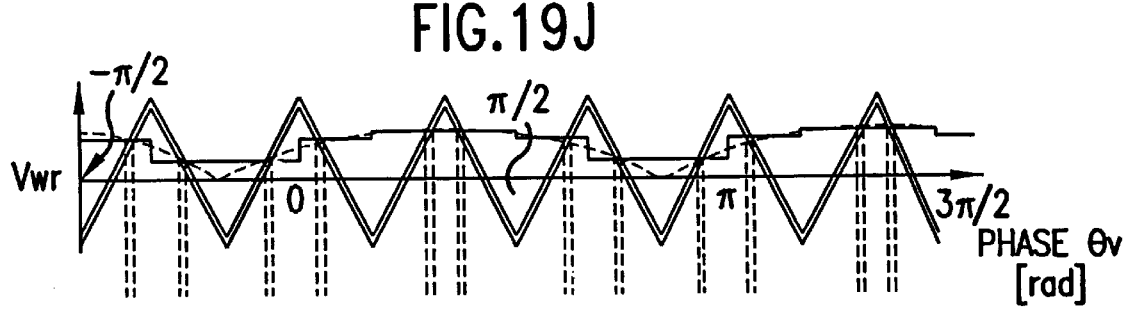
Figure 19L:
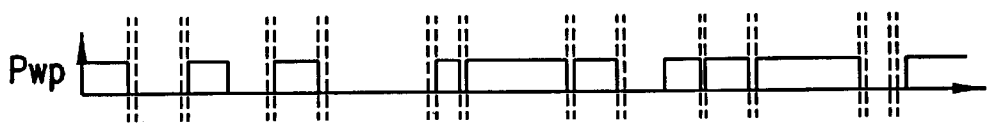
Figure 19M:

The voltage signal signals Fu, Fv and Fw obtained in this way are compared at the PWM generation device 11 as shown in FIG. 13, outputted as fundamental PWM signals Pu1, Pu2, Pv1, Pv2, Pw1 and Pw2 for each phase and inputted to the PWM signal switching circuit 16. The PWM signal switching circuit 16 is comprised of a U-phase processor 17u, V-phase processor 17v and a W-phase processor 17w, as shown in FIG. 18, and carries out the same processing.

A description is given here of the U-phase processor 17u. Delay circuits 18a and 18b that delay, rising by a prescribed dead, time only on the rising part of the signal are provided at an input part for the voltage signal Fu. With the circuits provided, there is no delay for when a signal falls.

With the above circuit configuration, Pu1 is outputted as the PWM signal Pup and Pu2 is outputted as the PWM signal Pun when the voltage signal Fu is 1, i.e., when the voltage sign is positive. On the other hand, Pu1 is outputted as PWM signal Pun and Pu2 is outputted as PWM signal Pup when Fu is 0, i.e. when the voltage sign is negative.

This is expressed as waveforms in a timing diagram in FIG. 19. Here, Pu1 is a usual wide band PWM signal and Pus is a usual narrow band PWM signal. The manner in which a U-phase upper arm PWM signal Pup and a lower arm PWM signal Pun are obtained from the relationship of output signals Fu1 and Fu2 coming from the voltage signal Fu via the delay circuits 18a and 18b and a NOT circuit and signals Pu1 and Pu2 can be understood from the circuit diagram of FIG. 18 and the timing diagram of FIG. 19.

The signals Pup and Pun are the same waveforms but are 180 degrees out of phase with each other. The occurrence of even harmonic frequencies in the output current of the inverter 3 can therefore be suppressed as a result of using these waveforms. If the PWM generating method for switching mode Sw=6 is taken to be the same as for Sw=3 and 9, even harmonic frequencies occur because Pup and Pun are totally different waveforms.

In this second embodiment, upper arm and lower arm PWM signals can be simultaneously obtained while taking dead time into consideration and circuit configuration can therefore be simplified. It is further also possible to take a microcomputer having a dedicated circuit for generating a PWM signal using two carrier waves currently on the market (for example, SH7034 of Hitachi Co. Ltd. ) and further simplify circuit configuration with this embodiment.

It is also possible to manufacture an LSI dedicated to inverter control employing a synchronous PWM signal by incorporating the PWM signal generating circuit included in circuits up to FIG. 18 into a microcomputer.

In the embodiments described here, the waveforms for the PWM signals Pup and Pun are not strictly symmetrical taking the phase 0 as center because delay circuits 18a and 18b that only delay on rises of signals are used but symmetrical waveforms can be obtained by modifying the configuration of the circuit.

According to these embodiments, smooth synchronous PWM control switching can be carried out even for motor control systems requiring high-frequency current control and stable, high-performance torque control with few current ripples can be achieved with an inexpensive control device.

In the above embodiments of the present invention a description has been given of a system driving a synchronous motor but the present invention can also be applied to other alternating current motors such as induction motors. Further, synchronous PWM signal switching modes of 3, 6 and 9 are described but switching modes of 12 and 15 etc. can also be added.

In the above description, the current control operation period is set to be the same as the carrier wave period and the voltage operation period is set to be ½ of the carrier wave period so as to give a characteristic where the minimum value for the carrier wave is usually the same value. However, if the processing performance of the control device is high, the control current operation period can be made to be the same as the voltage operation period. On the other hand, the present invention can be applied with the current control operation period made even longer if deterioration in current control performance is allowed.

A method where a carrier period is gradually corrected using the motor, rotation angle and the phase of the output voltage is described as the method for putting the PWM signal in synchronism so that this method has the benefit of having little effect upon the current control. The present invention can also be applied in such a manner that the carrier wave frequency can be made to always coincide with the phase of the output voltage every sample time in a more rigorous manner.

According to the present invention, power conversion device output currents at frequencies from $\frac{1}{10}$ to as high as $\frac{1}{3}$ of the carrier frequency can be controlled in a stable manner while using a low-cost control device employing PWM signals for carrier wave comparisons so that an alternating current motor can be made smaller and at a lower cost.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A motor control system comprising:

carrier wave generating means for generating first and second carrier waves having a prescribed difference;

pulse width modulation control means for generating first and second pulse width modulation signals by comparing an a.c. voltage command value and said first and second carrier waves, respectively;

an inverter having at least one pair of positive side and negative side switching elements to be driven by said first and second pulse width modulation signals, for generating an output voltage;

means for alternately causing said first pulse width modulation signals to be applied to said positive side switching elements and said second pulse width modulation signals to be applied to said negative side switching elements in a first mode, and for causing said second pulse width modulation signal to be applied to said positive side switching elements and said first pulse width modulation signal to be applied to said negative side switching elements in a second mode; and a mode selecting unit for controlling switching between said first and second modes.

2. The motor control system of claim 1, wherein said pulse width modulation signal generating means alternately outputs said first and second pulse width modulation signals in accordance with a phase of said a.c. voltage command value, and inverts a sign of said a.c. voltage command value while alternately outputting said pulse width modulation signals.

3. A motor control system according to claim 1, wherein said carrier wave generating means, said pulse width modulation control means and said switching means are comprised by a microcomputer.

4. A motor control system according to claim 3, wherein said microcomputer is a single chip microcomputer.

5. A motor control system according to claim 1, wherein said mode selecting unit controls switching between said first and second modes as a function of motor speed and a period of said output voltage.

6. A motor control system comprising:

carrier wave generating means for generating first and second carrier waves having a prescribed difference;

pulse width modulation control means for generating first and second pulse width modulation signals by comparing an a.c. voltage command value and said first and second carrier waves, respectively;

an inverter having at least one pair of positive side and negative side switching elements to be driven by said first and second pulse width modulation signals, for generating an output voltage;

means for alternately causing said first pulse width modulation signals to be applied to said positive side switching elements and said second pulse width modulation signals to be applied to said negative side switching elements in a first mode, and for causing said second pulse width modulation signal to be applied to said positive side switching elements and said first pulse width modulation signal to be applied to said negative side switching elements in a second mode; and a mode selecting unit for controlling switching between said first and second modes;

wherein a frequency of said carrier waves is an even-numbered multiple of a frequency of said a.c. voltage command value.

* * * * *